Jan. 12, 1954    C. B. LANSING ET AL    2,665,944
INSTANTANEOUS COATING MATERIAL HEATING UNIT
Filed Dec. 22, 1949    4 Sheets-Sheet 1
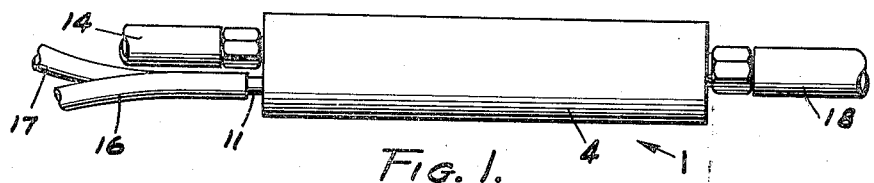
Fig. 1.
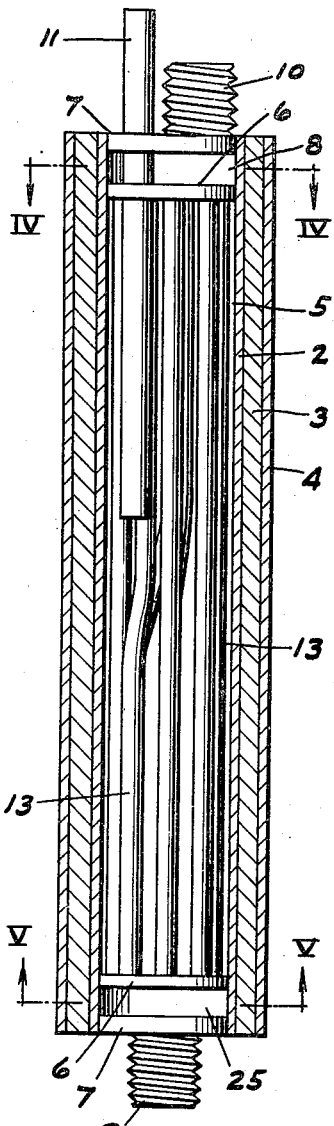
Fig. 2.
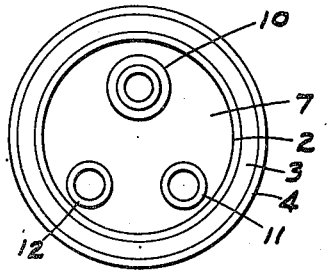
Fig. 3.
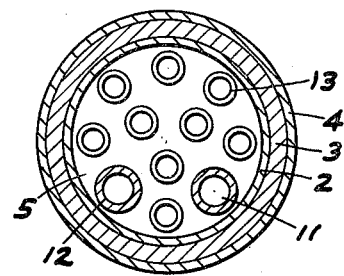
Fig. 4.
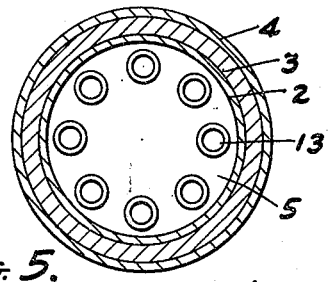
Fig. 5.
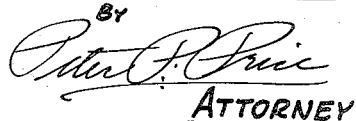
INVENTORS
CHARLES B. LANSING
EDWARD G. HART
BY
ATTORNEY

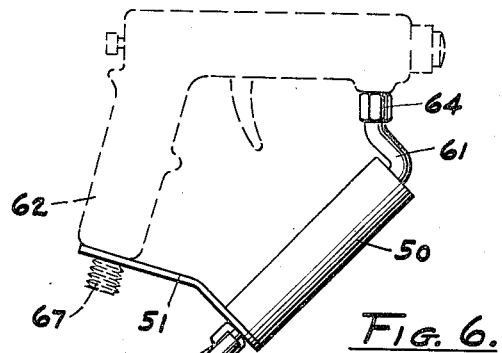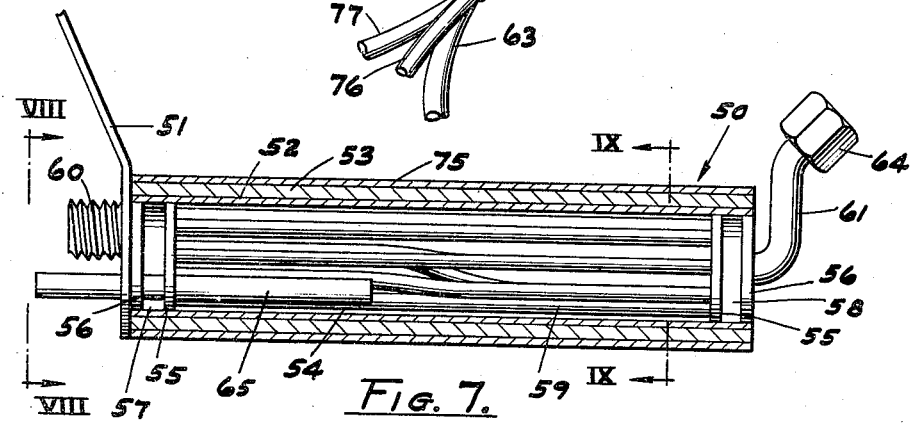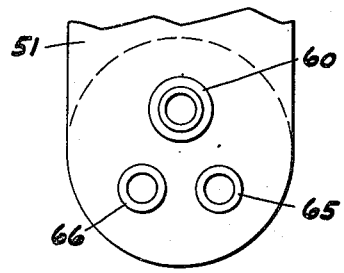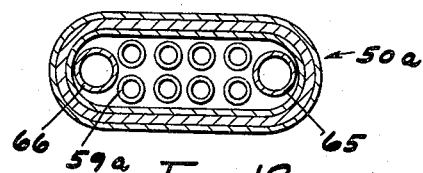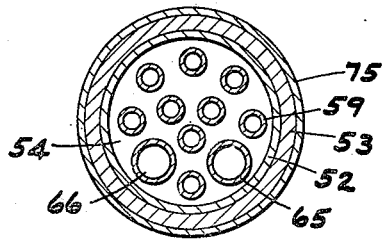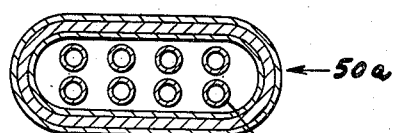

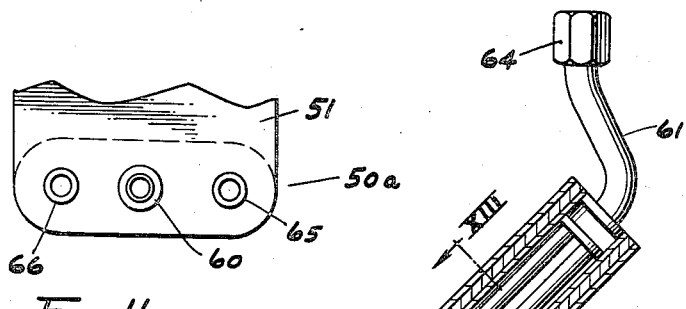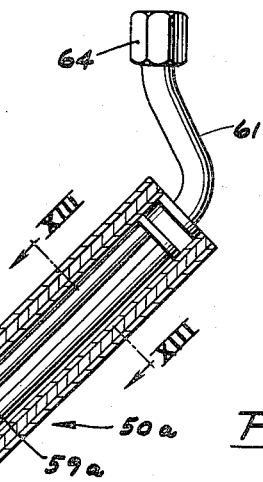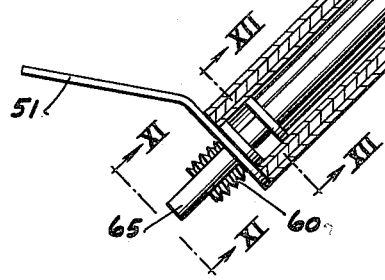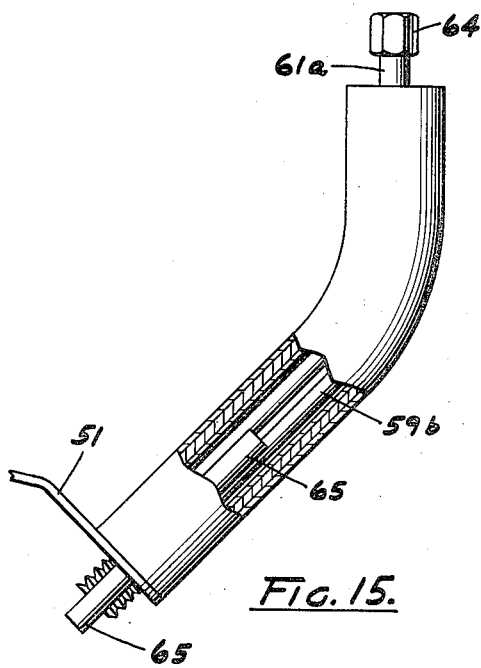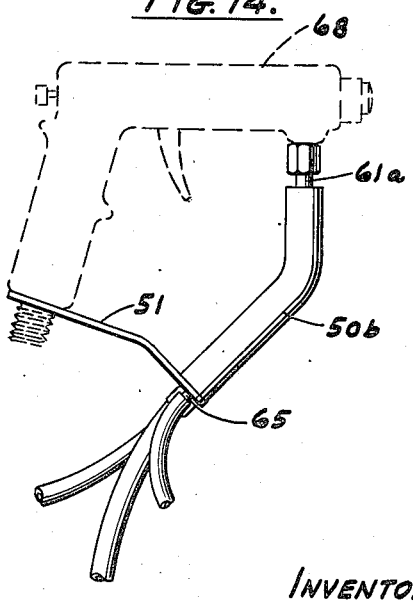

Patented Jan. 12, 1954

2,665,944

UNITED STATES PATENT OFFICE 2,665,944

INSTANTANEOUS COATING MATERIAL HEATING UNIT

Charles B. Lansing and Edward G. Hart, Cleveland, Ohio, assignors to The Arco Company, Cleveland, Ohio, a corporation of Ohio Application December 22, 1949, Serial No. 134,535

1 Claim. (Cl. 299—86)

This invention relates to the art of spraying and more particularly to an apparatus designed to heat, in minute quantities, sprayable coating materials by means of steam. The invention contemplates the heating of the stream of coating material as it flows toward the spray gun.

The problem of spraying comparatively thick coats of lacquers, synthetic enamels and similar coating materials, although the subject of much research, effort and experimentation, has not, until now, been successfully solved.

Coating materials such as lacquers must be applied in such a manner that they provide a smooth coat of substantially uniform thickness. When the coating material is applied cold, that is, at normal room temperatures of 60 degrees to 70 degrees Fahrenheit, it is necessary to dilute these coating materials with at least an equal quantity of solvent to permit spraying. This reduces the viscosity of the material to a point suitable for spraying. However, since the coating material has been thinned by the solvent, a series of thin coats must be applied to obtain a film of satisfactory thickness. If it is attempted to apply, as a single coat, the quantity of material involved in these several coats, the result will be unsatisfactory because of slumping, producing undesirable ridges of material. The temperature of the coating material, as sprayed, is substantially the same as the surface upon which it is deposited. Therefore, there is insufficient cooling to heavy up the coating material before it can slump. Further, the rate of vaporization of the solvents is too slow to increase the viscosity before slumping can occur. If, to prevent this slumping, the proportion of solvents is reduced, the viscosity of the coating material increases such that the spray gun is unable to properly atomize the coating material, resulting in blobs and mounds of material being deposited on the surface. Thus, the application of heavy coats of these coating materials at room temperature is limited to an operation consisting of the successive application of a number of thin coats sufficient to accumulate the desired total film thickness.

It is apparent that the solution to this problem lies in decreasing the viscosity of the coating material during the time it is being atomized and actually being deposited upon the surface and rapidly increasing this viscosity immediately thereafter. This can best be accomplished by heating the coating material before spraying. The application of heat materially reduces the viscosity of the coating material, thus, the viscosity may be regulated to that satisfactory for spraying without dilution of the coating material with solvents. With the proper application of heat this condition of reduced viscosity will endure through the steps of atomization and deposit. The heated coating material will be sufficiently flowable to form a film of substantially constant thickness on the surface, yet will regain its viscosity after deposit at a sufficiently accelerated pace to prevent slumping.

This rapid increase in viscosity of a heated coating material results from both cooling of the coating material and evaporation of the solvents. Since the coating material is applied at an elevated temperature, the thermal differential between the coating material and the surface to which it is applied will cause rapid absorption of the coating material's heat by the surface. Since the low viscosity of the coating material is due entirely to heat rather than additional solvents, this cooling will rapidly increase the viscosity of the coating material to substantially that of undiluted cold coating material. In addition, the elevated temperature of the coating material will cause some of the solvents to vaporize rapidly, further increasing the coating material's viscosity. In practice, the cooling effects the greater portion of the flow stabilization of that portion of the coating material film adjacent the surface being coated and vaporization of the solvents effects the greater portion of the flow stabilization of the exposed surface of the film. This flow stabilization permits the same film thickness of coating material to be applied in a single application as may be applied in several coats when used cold.

Although the heating of coating materials, prior to application, has proved to be a solution for the problem of successfully applying thick coating of the material in a single application, the mechanics by which this is accomplished has remained a major obstacle. The temperature to which coating materials of this type and particularly lacquers may be heated must be held within a relatively narrow, critical range. Above this critical range the heat deteriorates the coating material, and in some cases the volatilization of the solvents becomes so rapid that insufficient flow occurs to obtain a coating of constant thickness. Below this critical range the coating material is too viscous to be properly sprayed and insufficient flow occurs to provide a smooth film. Further, temperatures above the critical range may result in chemical modification of the coating material, rendering it unfit as a coating material.

The problem of maintaining the coating material's temperature within the critical range is complicated by the fact that, normally, the coating materials are intermittently applied. Thus, the number of B. t. u.'s necessary to maintain the coating material within the prescribed temperature limits varies through a wide range. To avoid overheating and underheating under such circumstances, the heating means must be one having a maximum temperature not greatly in excess of the upper limit of the critical range even though the flow of coating material is stopped for an appreciable length of time. At the same time, the heating element must be capable of delivering adequate B. t. u.'s to heat the coating material to temperatures within the critical range even though the sprayer is being used for an indefinitely extended period at maximum flow capacity.

The standard equipment provided for the pre-spraying heating of coating materials employs a bulk heating tank entirely separate from the spraying apparatus and frequently spaced a substantial distance from the spraying apparatus. The coating material is forced, in heated condition, to the spray gun through a long tube or hose. This is an unsatisfactory arrangement for several reasons. One of the most serious faults of this system is the fact that the coating material cools substantially between the tank and the spray gun due to thermal losses through the hose wall. This thermal loss is quite appreciable even though the spray gun is in substantially constant use. When the gun is not used, even for only a short time, the coating material in the connecting hose cools below a temperature at which preheating serves any purpose. The result is that the coating material sprayed after a period of non-use will be only partially atomized and will slump and otherwise produce an unsatisfactory product until freshly heated coating material has been drawn from the tank to the spray gun. Since the hoses are normally long, the quantity of coating material thus rendered unsuitable is considerable, representing a serious loss in material, time and labor. This difficulty cannot be overcome merely by increasing the temperature of the coating material in the heating tank because of the detrimental effect upon the material itself. The safe upper temperature limit is so low that a wide range of temperature gradient cannot be provided to compensate for these thermal losses. It has not been found practical to supply heated air to the spray gun to compensate for these thermal losses. Air has such a low specific heat that it is incapable of appreciably raising the temperature of the coating material.

Attempts to overcome this difficulty by heating the hoses have failed to produce any practical results. When the heating medium was air, insufficient heating was effected unless such a large volume of air at such a high temperature was employed that the entire arrangement became impractical. Electrical heating of the hoses is impractical because of the bulk and weight of the necessary control and explosion-proof equipment. In both cases the equipment involved rendered the hoses bulky and inflexible, interfering materially with the manipulation of the spray gun.

In addition, the tank and hose arrangement produces unsatisfactory results when, for any reason, the material overheats and scorching or polymerization takes place. When this occurs, by reason of the volume of material held in storage in these tanks, a large quantity of coating material is spoiled. The removal of this material is a long and costly procedure, complicated by the size of the tanks, the length of the hoses, and the quantities of material involved.

Another difficulty which has retarded development in this field is the explosion hazard due to the volatile solvents employed. These solvents make equipment involving either an open flame or a hot wire so hazardous that the necessary safety equipment is almost as complicated and bulky as the tank and hose equipment to which they are attached. Even the use of the less hazardous of these, electrical heating, requires such careful shielding and control equipment that the units become impractical by reason of size and cost. The bulk and weight of this equipment makes it entirely unsatisfactory for use with the conventional hand spray guns.

This fire hazard is one of the most serious complications of the heating of coating materials. The constant danger not only makes it impossible to use any type of open flame and makes it necessary to entirely seal all electrical equipment but it also renders any overheating of the material extremely hazardous. When overheating occurs, not only do the solvents rapidly build up excessive pressures in closed containers but their flash point is so low that an explosion easily may occur if any oxygen is present. Thus, no source of heat, normally having temperatures much in excess of the upper limit to which it is desirable to heat the coating material is either desirable or practical. Such a low maximum temperature cannot be obtained from electricity.

This fire hazard complicates the heating problem in another way. When attempts are made to heat bulk containers involving large quantities of coating material, the heating process is slow since the upper temperature limit of the heat source must be held so low. This results in a costly delay each time it is necessary to raise the temperature of the coating material from room temperature to operating temperature. Despite these difficulties, the present equipment for the preheating of coating materials involves the principle of heating the coating material in bulk at a central source and then distributing it to one or more spray guns through extended lines of hose.

Among the principal factors contributing to the capacity of our invention for solving this heating problem are using a medium of high heat content or specific heat and low temperature for our source of thermal energy, heating only a minute quantity of coating material at any one time, and applying the heat to the coating material adjacent the spray gun.

Steam provides an ideal source of thermal energy for our invention. It does not involve a fire hazard. Although our invention is designed to operate primarily with low pressure steam between 1 and 10 pounds per square inch gauge, it may be operated at pressures up to 30 pounds per square inch gauge. Even with the higher pressure steam there is no danger of igniting the solvents. Therefore, all of the fire precautionary equipment and controls necessary with other types of thermal energy may be eliminated. Closely associated with this elimination of fire hazard is the fact that the maximum temperature of steam within these lower pressure ranges does not greatly exceed the upper temperature limit to which the coating materials may be safely heated. Thus, it becomes feasible to effectively regulate the temperature of the coating material by the design of the heat exchanger rather than by means of thermostats and valves.

Our invention eliminates many of the undesirable features of previously existing equipment by providing a structure whereby the coating material is heated in comparatively minute quantities as it flows from the bulk container to the spray gun. Thus, the heating unit, at any particular moment, need only have the capacity to effectively heat that quantity of coating material constituting the momentary demand of the spray gun. Therefore, the heating unit is never required to heat more material than is represented by the instantaneous volume of coating material demanded by the spray gun when the spray gun is operated at maximum capacity. Thus, with the standard type of spray gun, the heating unit will have to have a capacity sufficient to heat approximately two or less pints of coating material per minute. The problem of providing a heating unit capable of rapidly heating large quantities of coating material is automatically eliminated. Also eliminated is the necessity for a heating unit having a maximum temperature greatly in excess of the critical temperature range of the coating material.

The concept of heating separately and substantially instantaneously, by means of a relatively low temperature, high specific heat, thermal energy source, each of the individual streams of coating material flowing toward each of the spray guns is the application of a new principle to this problem. In place of attempting to heat large quantities of coating material at a substantial distance from the spray gun, our invention heats small quantities of material adjacent to the spray gun.

The use of a heater of very small capacity has certain important practical effects. Particularly is this true since the unit is incorporated into the spraying system adjacent to rather than remote from the spray gun. First it permits, with certain types of coating materials, elimination of spoilage and with other types of coating materials it reduces spoilage, due to overheating or underheating, to a negligible amount. Although the specific temperature will change from material to material, it is generally necessary to heat the coating materials to a temperature of at least 125 degrees Fahrenheit. If the temperature exceeds 190 degrees Fahrenheit for any appreciable length of time, some injurious effect is normally experienced. This upper temperature limit and the length of the period at which the material may safely remain at this temperature varies widely between different materials. Where the material involved has a relatively high upper temperature limit or contains solvents having a comparatively low boiling point, the volatilization of the solvents will empty the heating chamber before the material is spoiled. This is possible since the heating unit capacity is small and only a small quantity of solvent must be volatilized to empty the heating unit of coating material. It is also possible because the heating unit is separated from the bulk material container, thus, making the bulk container a convenient escape for the coating material forced from the heating unit.

When spoilage does occur, the quantities involved are small, being only the material in the heating unit and the conduit between the heating unit and the gun nozzle. The total quantity of this material does not represent, at the most, more than a few seconds operation of the spray gun. The same is true of coating material which has become chilled in the conduit between the heating unit and the gun nozzle. It is standard spraying practice to emit, as waste, one or two bursts of material from the spray gun before starting to apply the coat. The total quantity of material contained by the heating unit and the conduit between the heating unit and the gun nozzle is so small that it will normally be exhausted by these bursts. This is an appreciable saving of material over that which is residual in the 10–50 feet of connecting hose employed in standard coating material heating units, not to mention the quantity of coating material in the bulk container when spoilage is due to overheating.

The simplified construction of the heating element provides a compact, lightweight structure capable of economical construction. It requires no special spray gun design and, with minor modification, may be attached to or used with spray guns of many different standard constructions.

It is, therefore, a primary object of our invention to provide means for separately heating coating materials for each individual spray gun.

It is an additional object of our invention to provide such heating means adapted for installation closely adjacent the spray gun.

It is a further object of our invention to provide such heating means adapted to heat only that quantity of coating material constituting the instantaneous volume of coating material flowing to the spray gun.

It is a further additional object of our invention to provide such a heating means reducing waste by elimination of or substantial reduction of spoilation.

A still further object of our invention is to provide such a heating unit adapted to use steam or some organic compound having substantially the same specific heat as its source of thermal energy.

Additional objects of our invention include providing such a heating unit of compact form, lightweight, reliable operating characteristics and adaptable to installation on a number of different spray gun designs.

Other objects and purposes of our invention will be seen immediately by persons acquainted with the art of spraying coating materials upon reading the following specification and the accompanying drawings.

In the drawings:

Figure 1 is a side elevation view of our coating material heating unit designed to be mounted in the coating material supply line.

Figure 2 is a sectional elevation view of our coating material heating unit with one-half the shell and insulation removed to expose the heating unit's internal structure.

Figure 3 is an end view of the intake end of our coating material heating unit.

Figure 4 is a sectional elevation view of our coating material heating unit taken along the plane IV—IV of Figure 2.

Figure 5 is a sectional elevation view of our coating material heating unit taken along the plane V—V of Figure 2.

Figure 6 is a side elevation view of our coating material heating unit adapted for mounting on a spray gun.

Figure 7 is a sectional elevation view of the coating material heating unit shown in Figure 6 with one-half the shell and insulation removed to expose the heating unit's internal structure.

Figure 8 is an end view of the modified coating material heating unit taken along the plane VIII—VIII of Figure 7, not showing the mounting bracket.

Figure 9 is a sectional view of the modified coating material heating unit taken along the plane IX—IX of Figure 7.

Figure 10 is a side elevation view of a modified coating material heating unit with a substantially rectangular cross-section with one-half the shell and insulation removed to expose the heating unit's internal structure.

Figure 11 is an end view of our coating material heating unit taken along the plane XI—XI of Figure 10.

Figure 12 is a sectional view of our coating material heating unit taken along the plane XII—XII of Figure 10.

Figure 13 is a sectional view of our coating material heating unit taken along the plane XIII—XIII of Figure 10.

Figure 14 is a side elevation view of a coating material heating unit having a V-shaped longitudinal axis and mounted on a spray gun.

Figure 15 is a partially sectional, elevation view of the coating material heating unit shown in Figure 14.

Figure 16:
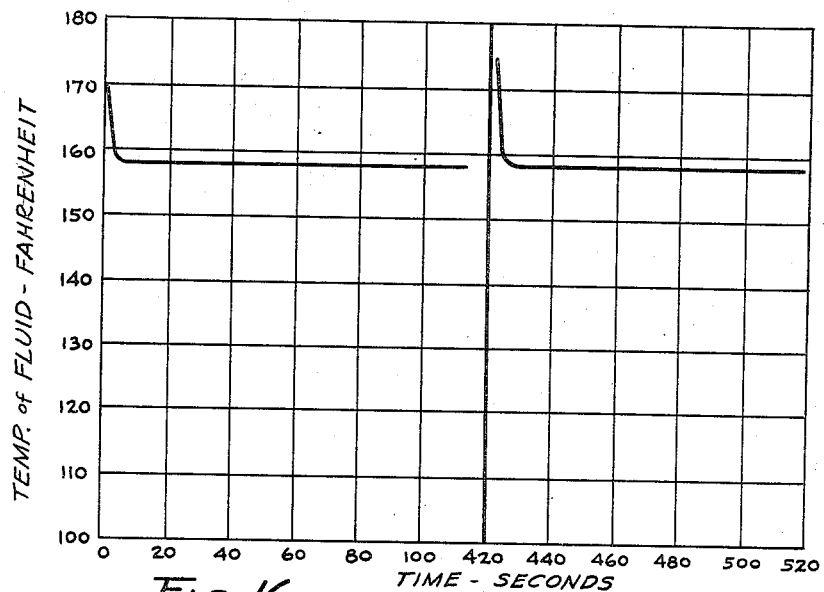
Figure 16 is a performance chart of one of our heating units.
Figure 17:
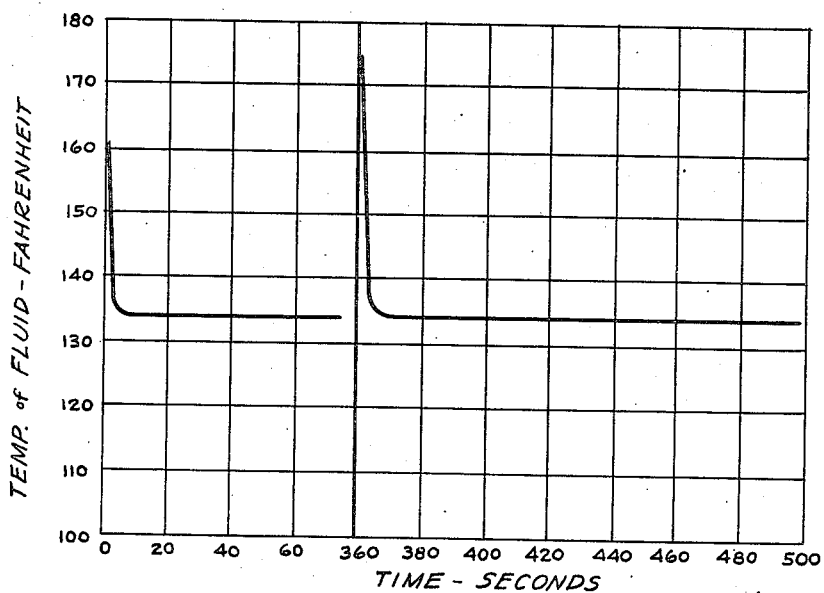
Figure 17 is a performance chart of one of our heating units.

In executing the objects and purposes of our invention we have provided a heating unit consisting of a sealed container forming a heat exchanger into which the coating material is admitted at room temperature. The heating unit is mounted in the hose leading from the bulk container for the coating material to the spray gun either at or closely adjacent to the spray gun. While in the heating unit, the coating material is passed in heat exchange relationship to low pressure steam. The heat exchanger has a coating material capacity not in excess of the stream of coating material demanded by the spray gun when the spray gun is operated at maximum capacity.

Referring to the drawings in greater detail, the numeral 1 (Figs. 1 through 5) indicates a heating unit having an inner tubular shell 2 covered by an inner layer of insulation 3 and an outer layer of insulation 4. The inner layer of insulation 3 consists of a sheet of cork or asbestos or some suitable insulating compound. The outer layer 4 consists of a tape, rubber envelope or other suitable material which will hold the inner layer 3 in place and withstand the wear incident to handling. The interior of the inner shell 2 defines a chamber 5 closed on each of its ends by a bulkhead or tube plate 6. Spaced outwardly from each of the tube plates 6 is an end plate 7. A compartment 8 is enclosed at one end of the heating unit 1 between a closure member or tube plate 6 and an end plate 7, and another compartment 25 is enclosed between a tube plate 6 and an end plate 7 at the other end of the heating unit 1. The compartments 8 and 25 are identical in shape and size. The tube plates 6 and end plates 7 are each attached to the inner shell 2 by means of solder or welding. Whatever means of attachment is chosen, a pressure tight seal must be effected between the tube plates 6, end plates 7 and the inner shell 2 to prevent the escape of either steam or coating material.

At one end of the heating unit 1 is a threaded connection 9, communicating with the compartment 25. On the other end of the heating unit 1 a threaded nipple 10 communicating with the compartment 8. On the same end of the heating unit 1 as the threaded nipple 10, a pair of tubular conduits 11 and 12 pass through the compartment 8 to communicate with the chamber 5. The conduit 11 functions as a steam inlet and projects into the chamber 5 a substantial portion of the chamber's length. The conduit 12 functions as a steam and condensate outlet and does not project into the chamber 5 beyond the tube plate 6.

A cluster of spaced tubes 13, extending between and communicating with the compartment 8 and the compartment 25, are mounted longitudinally of the chamber 5. The tubes 13, together with the chamber 5, form a heat exchanger element.

The heating unit 1 is designed to be mounted in the coating material supply hose adjacent the spray gun. It is preferably spaced a sufficient distance from the spray gun that the operator may hold the spray gun in one hand and the heating unit 1 in the other hand, with sufficient hose between, that the spray gun may be easily manipulated. It has been found that a spacing of 30 inches between the spray gun and the heating unit 1 provides the maximum length of hose normally necessary. By so mounting the heating unit 1, the spray gun is left free from the weight of the heating unit and it is unnecessary to move the steam hoses with the spray gun.

Steam from a suitable source is admitted to the chamber 5 by means of the steam line 16 and the conduit 11. Waste steam and condensate are removed from the chamber 5 by means of the conduit 12 and condensate line 17. The condensate line 17 may be connected to a low pressure condensate return or to any other suitable means for disposing of the condensate. Coating material, at normal room temperature from a source of bulk coating material such as a drum or tank, is supplied to the heating unit 1 by means of the hose 14. The hose 14 is attached to the threaded nipple 10. Thus, the coating material required by the spray gun passes from the coating material source through the hose 14 into the compartment 8 and then to the compartment 25 by means of the tubes 13. The coating material is then led to the spray gun by means of the tube 18. As the coating material passes through the tubes 13, it is heated by the steam in the chamber 5.

The hose 14, steam line 16, condensate line 17 and tube 18 are each flexible whereby the heating unit 1 may be easily moved during spraying with a minimum of resistance from these supply and discharge lines.

The heating unit 50 (Figs. 6, 7, 8 and 9) is constructed upon the same structural and functional principles as the heating unit 1 except that it is intended to be mounted upon the spray gun itself between points adjacent the nozzle and the pistol grip. The internal structure and arrangement of the heating unit 50 is substantially identical to that of the heating unit 1. The only difference between the heating unit 1 and the heating unit 50, is the addition of the support bracket 51. By reason of its small size and lightweight, it may be mounted in the coating material supply hose immediately below the spray gun without seriously affecting the maneuverability of the spray gun.

The heating unit 50 has a shell 52 surrounded by a layer of suitable insulating material 53 such as cork or asbestos. The layer of insulating material 53 is protected by a heat insulating covering 75 such as tape, rubber or other suitable wear resistant material. Within the shell 52 is a central chamber 54 closed on each end of its ends by a tube plate 55. An end plate 56 is spaced outwardly from each of the tube plates 55. A compartment 57 is enclosed between the tube plate 55 and the end plate 56 on one end of the heating unit and another compartment 58 is enclosed between the tube plate 55 and end plate 56 on the other end of the heating unit 50. A plurality of tubes 59 extend through the central chamber 54 and communicate with each of the compartments 57 and 58.

A coating material inlet pipe 60 communicates with the compartment 57 and a coating material outlet pipe 61 communicates with the compartment 58. The inlet pipe 60 is threaded at its outward end to adapt it for attachment to a coating material supply hose 63. The outlet pipe 61 is equipped with a threaded fitting 64 for attachment to the coating material intake port of a standard type of spray gun 62. A steam inlet, tubular conduit 65 extends through the compartment 57 and along a substantial portion of the length of the central chamber 54. A steam outlet tubular conduit 66 extends through the compartment 57 and communicates with the central chamber 54, terminating substantially flush with the inward face of the tube plate 55. The steam inlet conduit 65 and the steam outlet conduit 66 are connected to a steam supply line 76 and a steam removal line 77, respectively.

The heating unit may be circular (heating unit 50, Figure 4) or it may be substantially rectangular in cross-section (heating unit 50a, Figs. 10, 11, 12 and 13). The principle of operation is identical and the only change in structure is in the arrangement and shape of the tubes in the central chamber 54. In the heating unit 50 some of the tubes 59 are bent between the compartments 57 and 58 to permit entry of the steam supply and exhaust ports, whereas in heating unit 50a the tubes 59a extend the length of the central chamber without any bend. Longitudinally, the heating unit may be straight, heating unit 50, or formed in a V between its ends, heating unit 50b, as shown in Figures 10 and 15, respectively. The heat exchanger tubes 59b in the heating unit 50b are bent to conform with the V-shaped contour of the heating unit. All of the other parts making up the heating unit 50b, except the outlet pipe, are identical to the parts used in the heating units 50 and 50a. The particular design shape may be selected as design convenience dictates since it has no effect upon the structural and functional principles of our invention. The design affects only the shape of the parts employed. When the heating unit is straight, as shown in Figure 1, the outlet pipe 61 is bent to form an S whereby the threaded fitting 64 may align with and engage the coating material intake port of the spray gun 68. When the heating unit is V-shaped, the outlet pipe 61a is straight, as shown in Figure 6, since the axis of the heating unit is already aligned with the intake port of the spray gun 68.

The outlet pipe 61 or 61a, together with the threaded fitting 64, detachably mounts one end of the heating unit on the spray gun 68 by engaging the coating material intake port of the spray gun adjacent the nozzle of the spray gun. The other end of the heating unit is supported by a bracket 51 attached to the heating unit by welding, soldering or seating over the inlet pipe 60 and tubular conduits 65 and 66, or both. The bracket 51 mounts over the air intake fitting 67 of the spray gun 68. Thus, the heating unit is adapted for quick and easy mounting and demounting on the spray gun 68. The bracket 51 is bent through a minor angle so that its longitudinal axis will be perpendicular to both the intake fitting 67 at one of its ends and the heating unit at the other of its ends. The same bracket 51 is employed whether the heating unit is straight or bent in the middle.

The various parts of the heating units 1, 50, 50a and 50b, and their associated fittings, may be made of any suitable material such as brass, stainless steel or aluminum. The material chosen must be inert in the presence of the coating material and must be suitable to the type of forming required to fabricate the unit. The various coating material conduits, whereby the coating material is supplied from the heat exchanger to the spray gun, may be insulated by suitable means such as an asbestos or rubber, tubular covering.

OPERATION

Since each of the heating units described in the foregoing paragraphs operates upon the same principle, the operation of all of the heating units is covered by the following single description.

After the heating unit has been mounted in its operating position and all of the necessary hose and supply lines have been connected to the heating unit, the coating material supply hose is attached to a suitable source of coating material such as a bulk tank or drum. This coating material is at a temperature, usually normal room temperature, sufficient to give the coating material a viscosity whereby it may be forced through the supply hose to the heating unit without the necessity of excessive pressures. Normally the pressure used to move the coating material through the supply hose should not exceed 30 pounds per square inch. The coating material is moved from the supply source to the heating unit by any conventional means such as pressure applied to the material in the tank or drum or by means of a pump. Normally, and particularly when the material is pumped, some type of pressure equalizer is used to dampen pressure fluctuations. The importance of this equalizer will appear more fully hereinafter. Steam from any suitable source, preferably at 1 to 10 pounds per square inch gauge, but permissibly at pressures as high as 30 pounds per square inch gauge, is then admitted to the central chamber of the heating unit. When sufficient time has elaspsed to permit the coating material in the heating unit to be heated to the desired temperature, the spray gun may be operated. This lapse of time, normally, does not exceed a few seconds since the quantity of material is so small.

The temperature of the coating material, as it leaves the heating unit, is preferably within the range of 125 degrees to 190 degrees Fahrenheit. The optimum operating range, however, is between 135 degrees and 160 degrees Fahrenheit.

The object of heating the coating material is to temporarily reduce its viscosity while it is being deposited on the surface being coated and, thereafter, to rapidly increase its viscosity to prevent excessive flow. By heating the coating material to 125 degrees Fahrenheit, the viscosity of the coating material is materially reduced. The rate of viscosity reduction is greater in the range between 60 degrees and 125 degrees Fahrenheit than between 125 degrees and 190 degreees Fahrenheit. Within the range of 125 degrees to 190 degrees Fahrenheit a portion of the solvents, especially those having a low boiling point, will volatilize substantially immediately after deposit of the film of coating material. The coating material, although having a sufficiently low viscosity at the nozzle of the spray gun to permit thorough atomization, rapidly increases its viscosity due to rapid cooling and volatilization of the solvents.

By the application of heat, the viscosity of the coating material is reduced to a point where the coating material is suitable for spraying without the addition of further solvents. As the film of material forms on the surface being coated it cools rapidly by heat transfer due to the large thermal differential between the heated coating material and the surface. The cooling is sufficiently rapid to thicken the material before it can slump and form ridges. Sufficient flow occurs, however, to permit formation of a film of substantially constant thickness. This cooling affects primarily that portion of the film adjacent the surface being coated. Flow and slumping of the exposed surface of the film is controlled by evaporation of some of the heated solvents. Since, in this manner, a coating material of high viscosity, at room temperature, may be applied to a surface and its flow regulated, it is possible to apply in a single coat the same quantity of coating material which can only be applied by the use of several coats without heating. This is true since it becomes unnecessary to dilute the coating material with solvents.

The placement of the heating unit as close to the spray gun as possible is of equal importance. Thus, the heating units are designed to be mounted either directly on the spray gun or closely adjacent to it. From a thermal operating standpoint, the closer the heating unit is to the spray gun the more efficient becomes the operation. As the travel of the heated coating material between the heating unit and the nozzle of the spray gun is reduced, there is a corresponding reduction in heat loss. Thus, when the heating unit is close to the spray gun, coating material, at a given temperature, may be obtained at the nozzle of the spray gun, without initially heating it more than a few degrees above this selected temperature. This permits closer control of coating material temperatures. At the same time, changes in temperature may be rapidly effected since the total quantity of coating material involved in the whole heating system is small. The quantity of heated coating material is many times smaller than that involved when the bulk supply tank is heated and the coating material forced, in heated condition, through long supply lines to the spray gun.

The combination of proximity of the heating unit to the spray gun and the application of instantaneous heating provides coating material at a substantially constant temperature. When large quantities of material are involved and the distance between the heating unit and the spray gun is substantial, the coating material will be delivered to the spray gun at widely varying temperatures. This fluctuation in temperature is not limited to merely the initial operating period but continues throughout the entire operation. The elimination of these temperature fluctuations produces a film of better quality and appearance.

The proximity of the heating unit to the spray gun reduces waste. If the coating material becomes too cold or too hot due to intermittent operation of the gun, the quantity of material thus rendered unsuitable is so small that it may be dispensed by the spray gun in one or two seconds operation. This is sufficient to exhaust not only the material in the conduit between the heating unit and the nozzle but also the material in the chamber of the heating unit.

The heating units 1, 50, 50*a* and 50*b* are each designed to heat only that volume of coating material constituting the current flow demand of the spray gun. By heating only the stream of coating material as it flows toward the spray gun, the problem of providing sufficient thermal energy to heat satisfactorily the coating material is greatly reduced. It is unnecessary to employ a source of thermal energy capable of rapidly heating and of maintaining at an elevated temperature a large mass of coating material. The previously used devices for heating coating material have attempted to heat an entire mass of coating material often aggregating 50 to 100 pounds, thus, creating an irreconcilable conflict between the necessity for quickly heating a large quantity of material and the necessity of thereafter maintaining that material within a low, critical temperature range. Our invention brings the maximum and minimum limits of thermal demand closer together whereby a single type of heat source may properly and efficiently meet both requirements.

*Example I*

A lacquer having a high viscosity was heated in a heating unit employing steam having a pressure of approximately 5 pounds per square inch gauge. The heating unit was equipped with standard $\frac{3}{16}$ inch diameter tubes through the central chamber. The tubes were 3⅞ inches long and had a total effective heat exchange surface area of 15.3 square inches. Coating material was forced into the heating unit at approximately 70 degrees Fahrenheit and allowed to remain stationary in the heating unit approximately 10 seconds. The spray gun was then operated at a flow rate of 1½ pints of lacquer per minute. After the spray gun had been in operation for 70 seconds it was shut off for approximately five minutes and then operated again. The initial burst of material from the spray gun was gaseous. The temperature of the lacquer was measured as the lacquer emerged from the heating unit. The resulting temperature changes in the coating material are plotted in Figure 17.

This example shows that the maximum and minimum temperatures of the coating material were always held within the preferred temperature range of 125 degrees to 190 degrees Fahrenheit, and the lacquer remained within the optimum temperature range of 135 degrees to 160 degrees Fahrenheit when the spray gun was operating continuously. The maximum temperature was held well below the temperature at which the lacquer could be injuriously affected by the heat. The heating unit was capable of heating the lacquer to the desired working temperature within a few seconds time, reducing loss of operating time to almost nothing.

*Example II*

A lacquer having a high viscosity was heated in a heating unit employing steam having a pressure of approximately 5 pounds per square inch gauge. The heating unit was equipped with ¼ inch diameter tubes through the central chamber. The tubes were 3⅞ inches long and had a total effective heat exchange surface area of 20.4 square inches. The lacquer was forced into the heating unit at approximately 70 degrees Fahrenheit and allowed to remain stationary in the heating unit approximately 10 seconds. The spray gun was then operated at a flow rate of 1½ pints of lacquer per minute. After the spray gun had been in operation for 114 seconds, it was shut off for approximately five minutes and then operated again. The initial burst of material emitted by the spray gun was gaseous. The temperature of the lacquer was measured as the lacquer emerged from the heating unit. The resulting temperature readings of the lacquer are plotted in Figure 16.

The resulting temperature readings closely parallel those resulting from the use of $\tfrac{1}{16}$ tubes except that the range between maximum and minimum temperatures is less and the normal operating temperature range is higher.

These examples show that the principle of heating only small quantities of the coating material at any one particular time is an important factor in regulating the temperature of the coating material to limits within the preferred thermal range. It is also important in that it makes the heating unit closely responsive in time to the demands of the spray gun. Substantially all of the wasteful time lapse incident to heating the coating material in bulk is eliminated.

The use of steam as the heat source is critical to our invention. Since the critical range within which the coating material may be heated is both narrow and relatively low, the temperature of the heat producing medium must have a maximum temperature not greatly in excess of the top limit of the critical range for the coating material. Steam or organic liquids having substantially the same specific heat are the only practical source of constant low thermal energy also capable of delivering large quantities of thermal energy when needed. Electrical heating units capable of heating coating material above 125 degrees Fahrenheit at the rate of two pints per minute are too hot. When the electrical heating units are redesigned to lower their maximum temperature into a satisfactory range, they are incapable of providing sufficient heat energy to heat the coating material when the spray gun is operated at maximum capacity. It is true that by the use of appropriate thermostatic controls, electrical heating elements may be regulated within a narrow range. However, such arrangements are impractical where the heating unit is designed to be manually supported because of the weight and bulk of the required control equipment. Further, they are expensive and under the best circumstances present a more or less constant fire hazard.

Since steam, even at low pressures, such as 1 to 10 pounds per square inch gauge, contains a large quantity of latent heat, the heat exchanger elements may be compact, yet be capable of heating, as it flows toward the spray gun, all of the coating material required by the average spray gun, even when used at maximum capacity. This adapts the heating unit to use at or adjacent to the spray gun.

The temperature of the coating material is regulated by the thermal factors built into each of the heating units. Although they need not be so limited, the heating units are preferably so designed that they operate with 1 to 10 pounds per square inch gauge steam and maintain the coating material, when it is flowing through the heating unit, within the temperature of 125 degrees to 190 degrees Fahrenheit and the normal temperature of the coating material, when the spray gun is continuously operating within the temperature range of 130 to 160 degrees Fahrenheit. The problem of overheating is simplified by the use of low pressure steam since, even at the maximum pressure of 30 pounds per square inch gauge, the temperature of the steam does not exceed 250 degrees Fahrenheit. Other sources of heat energy, having substantially the same heat content, are incapable of providing this low differential between maximum temperature of the heat source and maximum temperature of the coating material.

Under normal circumstances, overheating of the coating material during nonoperating periods of the spray gun will be prevented since the heat exchange chamber will be exhausted of coating material by volatilization of the solvents. When the spray gun is shut off for more than a few seconds, the temperature of the coating material will rise rapidly in the heating unit causing the low boiling point solvents to volatilize. The expansion incident to this volatilization of the solvents will increase the vapor pressure in the heating unit, forcing the coating material back into either the bulk supply tank or the pressure equalizer. Thus, the heating unit will be emptied of coating material. Since the total quantity of coating material in the heating chamber is considerably less than one ounce, very little of the solvents have to be volatilized to empty the entire heating unit. When the coating material has been forced out of the heating unit it will cool and so will a portion of the vaporized solvents. This will condense some of the vaporized solvents, reducing the vapor pressure and permitting the coating material to reenter the heating unit for reheating. This alternate emptying and filling of the heating chamber will maintain the coating material in heated condition but protect it from overheating. This method of protecting the coating material against overheating can only be effectively operated when the total quantity of coating material involved is very small. This method of eliminating overheating is particularly practical because, for the average coating material, the increase in vapor pressure rises rapidly up to about 220 degrees Fahrenheit whereas the rate of spoilage rises slowly until after this temperature has been attained. In most coating materials at least some of the solvents volatilize between 170 degrees and 220 degrees Fahrenheit.

In certain coating materials the solvents used have too high a boiling point to vaporize and empty the heating unit before the coating material becomes overheated. When this happens, the coating material is spoiled, but, due to the small capacity of the heating unit, the quantity of coating material involved is negligible and may be exhausted by one or two short bursts of the spray gun.

If the heating unit is constructed without insulation, the total heat exchange surface is increased to compensate for the increased thermal demand. The length of the tubes 59 or 59a are increased to compensate for the added rate of thermal loss by the coating material.

The heating unit 50 is illustrated as mounted directly below the spray gun. Although this is the preferred location because of its convenience in handling, it is not the only operable mounting. The heating unit may be mounted above or behind the spray gun, with proper modification in the design of the hot coating material conduit and of the mounting bracket. The particular location of the heating unit will depend upon what is most appropriate for the particular design of spray gun to which it is to be attached.

Our heating unit protects the coating material from oxidation at these elevated temperatures because it excludes all oxygen from the coating material during and after heating. Further, as the elevated temperatures cause the volatile solvents to expand, excessive additional pressures cannot build up in the heating unit since the increase in pressure will be relieved by a portion of the material being forced back toward the bulk container. This is an additional safety feature of our invention.

The spray gun used with our heating units is illustrated as compact and having a pistol grip. This showing is for illustrative purposes only and is not to be considered limiting. The shape, size and construction of the spray gun are immaterial so far as the principle of our invention is concerned, although changes in the form of the spray gun may necessitate some modification of the means for mounting the heating unit and spray guns of larger capacity may require heating units of correspondingly increased capacity.

Our invention is designed to operate upon any type of flowable coating material. It is particularly designed to provide a practical and efficient heating unit for high viscosity lacquers. However, it is not limited to use with this particular type of coating material. It is necessary that the material to be heated in our invention have a viscosity, in the condition in which it is delivered to the heating unit, whereby it may be forced into the heating unit without the use of excess pressure.

It is possible, without departing from the principle of our invention, to design the interior of the heating unit in such a manner that the steam is confined to the tubes 59 or 59a and the coating material occupies the central chamber 54. Any such change in design must not be so made that the resulting unit ceases to be an instantaneous heater for the flowing coating material and becomes a reservoir of heated coating material in addition to a heating unit.

Many other changes may be made in the construction and design of the heating unit so long as the heating is accomplished by steam or an equivalent low temperature heat energy source and the thermal characteristics of the heating unit are such as to establish points of stable maximum temperature and minimum spraying temperature within the range of 125 degrees and 190 degrees Fahrenheit. These and other changes are each to be considered as covered by the hereafter appended claims unless the claims by their terms expressly state otherwise.

We claim:

In a heating unit for heating a coating material prior to spraying as said coating material flows to a spray gun from a bulk source, said spray gun having a nozzle and a handle, the combination comprising: a tubular housing defining a central chamber; tube plates closing each of the ends of said chamber; an end plate spaced from each of said tube plates in a direction away from said chamber and defining a compartment between one of said end plates and one of said tube plates at each end of said housing; a plurality of tubes communicating with each of said compartments and extending between said compartments through said chamber, said tubes having a maximum flow rate substantially equal to the maximum flow rate demand of said spray gun; means for admitting a low temperature, high specific heat source of thermal energy to said chamber; port means for admitting coating material to one of said compartments whereby said coating material may flow through said heating unit in heat exchange relationship to said source of high thermal energy; said heating unit formed through an arc adjacent its center to form a shallow "V"; means at one of the ends of said heating unit for mounting said heating unit to said spray gun adjacent the nozzle of said spray gun; means at the other of the ends of said heating unit for mounting said heating unit to the handle of said spray gun.

CHARLES B. LANSING.
EDWARD G. HART.

References Cited in the file of this patent

UNITED STATES PATENTS

| Number | Name | Date |
|---|---|---|
| 330,612 | O'Brien et al. | Nov. 17, 1885 |
| 514,935 | Kersenbrock | Feb. 20, 1894 |
| 1,621,289 | Sternberg | Mar. 15, 1927 |
| 1,745,492 | Kelch et al. | Feb. 4, 1930 |
| 2,481,813 | Bede | Sept. 13, 1949 |
| 2,488,089 | Maye | Nov. 15, 1949 |
| 2,499,448 | Axelson et al. | Mar. 7, 1950 |
| 2,532,995 | Chausse | Dec. 5, 1950 |